Sept. 3, 1946.　　　H. G. BUSIGNIES　　　2,406,800
DIRECTION FINDER WITH FILTER
Filed March 13, 1941　　　2 Sheets-Sheet 1

INVENTOR.
HENRI G. BUSIGNIES
BY
ATTORNEY.

Sept. 3, 1946.  H. G. BUSIGNIES  2,406,800
DIRECTION FINDER WITH FILTER
Filed March 13, 1941  2 Sheets-Sheet 2

INVENTOR.
*HENRI G. BUSIGNIES*
BY
*ATTORNEY.*

Patented Sept. 3, 1946

2,406,800

UNITED STATES PATENT OFFICE 2,406,800

DIRECTION FINDER WITH FILTER

Henri G. Busignies, Forest Hills, N. Y., assignor to International Standard Electric Corporation, New York, N. Y., a corporation of Delaware Application March 13, 1941, Serial No. 383,111

11 Claims. (Cl. 250—11)

The present invention relates to radio direction finders and more particularly to direction finders having a pick-up member physically or effectively rotating at a constant angular velocity.

It is an object of the invention to provide an improved radio direction finder which shall be capable of being used over a wide range of frequencies without critical readjustment of a number of separate antenna means while yet enabling a unidirectional indication to be obtained.

It is a further object to provide such a wide range direction finder which shall give a direct reading unidirectional indication.

It is a further object of the invention to provide an improved direction finder capable of giving a precise and unvarying indication of the direction of arrival of radio waves, even though such radio waves be keyed, modulated or even interrupted for substantial intervals of time.

The exact nature of my invention may best be understood from the following detailed description taken in conjunction with the annexed drawings in which:

Fig. 1 diagrammatically illustrates a radio direction finder system embodying my invention.

Figure 1:
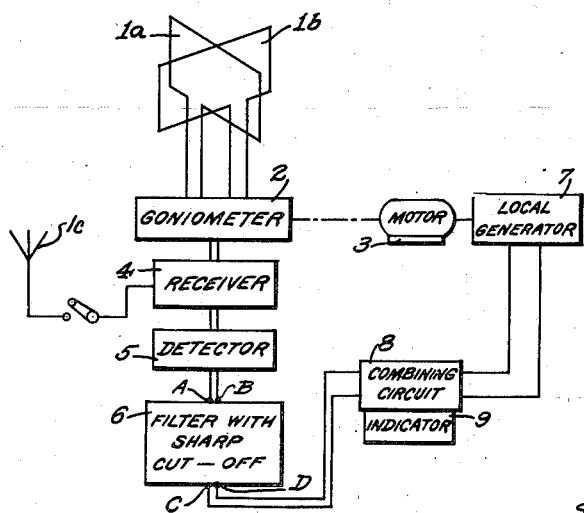

Referring more particularly to Fig. 1 crossed loops 1a and 1b are connected to a collector which is shown as a crossed-stator variocoupler of the type generally referred to as a goniometer driven by a motor 3 although it may alternatively be an electronic collector for performing an equivalent function.

The output of goniometer 2 is combined, if desired, with the pick-up from a non-directional antenna 1c, such combined wave is then amplified and preferably also heterodyned and tuned in receiver 4 and thereafter detected in detector 5. The output of detector 5 is then passed through a filter 6 which in accordance with an important feature of my invention is designed as a band pass or tuned filter rather than merely a brute force or smoothing filter of the untuned type.

A local generator 7 is arranged to be driven by the same motor 3 which drives the goniometer 2. The outputs of this local generator 7 and of the filter 6 are then combined in a suitable combining circuit 8 and used to produce an indication in a suitable indicator 9. The combining circuit 8 and indicator 9 may be of any suitable type. If the output of filter 6 is to be sinusoidal, which would be the case with all ordinary types of filters and also with the filters shown in Figs. 3, 4 and 5, and if the output of the local generator 7 is to be a series of very brief contact closures (or openings), then the combining circuit 8 and indicator 9 may have the form shown in Fig. 6. As shown in this figure the sinusoidal output from filter 6 is separated into two sine waves in phase quadrature by a phase splitter 61 and is thereupon applied to the deflecting plates 64, 65 of the cathode ray tube 9' so as to produce a rotating field. The brief circuit closures from generator 7, on the other hand, momentarily drive the vacuum tube 62 beyond cut-off thus producing momentarily high positive potential on accelerating electrode 63 of cathode ray tube 9'.

As explained in my copending application, Serial No. 380,982 filed Feb. 28, 1941, the effect of this potential on electrode 63 is to produce a radial deflection of the spot on the cathode ray screen. Thus the indication given on the cathode ray screen has the form of a circle with a radial line extending inward from one point of the circumference thereof toward the center. Such radial line will not quite attain the center but may be caused to approach thereto by the application of sufficient potential to electrode 63.

Figure 6:
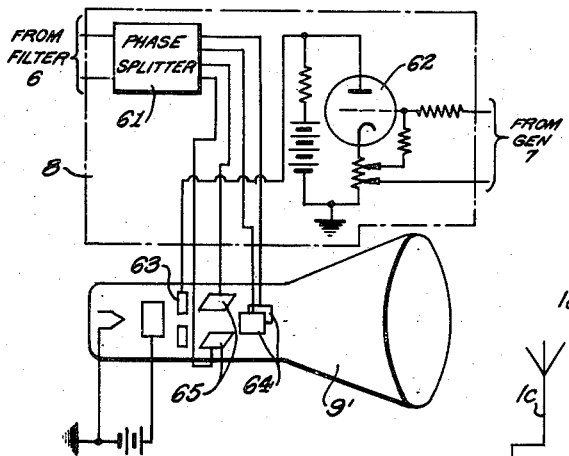
Fig. 6 illustrates one form of combining circuit and indicator schematically represented in Fig. 1, which form is suitable for use with filters of the types illustrated in Figs. 3, 4 and 5.

Other forms of combining and indicating circuits may be substituted for the forms shown in Fig. 6. Thus, for example, if generator 7 be arranged to give a sine wave, the output from this generator may be connected to another phase splitter similar to phase splitter 61 of Fig. 6. Then the rotating fields from the two phase splitters (fed respectively from the output of filter 6 and the output of generator 7) may be applied to two sets of deflecting plates so as to produce fields rotating in opposite directions. The result will be an oscillatory non-rotating field whose angle indicates the phase relationship between the wave from generator 7 and the wave from filter 6. Thus, under the influence of such oscillatory field the cathode ray spot will trace a line indicative of the direction of the received radio wave.

Such an arrangement is described and shown in more detail in the copending application of F. Bac and me, Serial No. 23,966, filed October 8, 1938, for "Systems for indicating the direction of propagation of electro-magnetic waves." See especially Figs. 3 and 4. In general, many different kinds of combining circuits and indicators may be used, in accordance with the present invention. Although the particular forms shown in Fig. 6 require sinusoidal output from filter 6 and a sharp momentary pulse from generator 7, whereas certain other forms require sine wave outputs from both the filter and the generator and still other forms require sharp pulses for both outputs, all of such systems may be used with the general system of Fig. 1 merely by changing the local generator 7 to fit the requirements and by selecting either a filter giving a sinusoidal output or one of the special forms of filters shown in Figs. 7 and 8 which give sharp pulselike outputs.

In direction finders wherein a rotation-modulated signal is detected before being used for giving an indication, it has previously been suggested to pass such detected faves through an ordinary smoothing filter, consisting of condensers and resistors for eliminating the radio frequency component while retaining the low frequency wave form substantially unaltered.

In accordance with the present invention a filter 6 is provided which is of the general class of filters sometimes known as "tuned" filters in contract to the filters of the so-called "brute force" type. Such "tuned" filters are proportioned with respect to a predetermined cut-off frequency so as to provide a very great discrimination between those frequencies lying above said cut-off and those lying below. Such filters may be of the low-pass type or of the band-pass type and in some cases may be merely tuned circuits, thus being capable of passing only a single frequency. In all cases, however, it is proposed in accordance with my invention to design the filter 6 with reference to a particular frequency determined by the rate of rotation of goniometer 2 or of the pick-up loop, if a rotating loop is used instead of crossed loops and a goniometer. In general, it may be stated that the filter is to be proportioned with respect to the frequency of effective rotation of the reception pattern of the pick-up arrangement employed whether this pick-up arrangement comprises Adcock antennae or crossed loop antennae with some sort of rotating or effectively rotating collector, or whether it comprises a single loop which itself rotates.

It is preferred, moreover, that the filter 6 should have a sufficiently steep change in attenuation with frequency so that a frequency one octave above the desired frequency will be substantially suppressed. Preferably, too, the filter should be designed so as to substantially suppress even those frequencies lying ten per cent. above and below the desired frequency.

Figure 2:
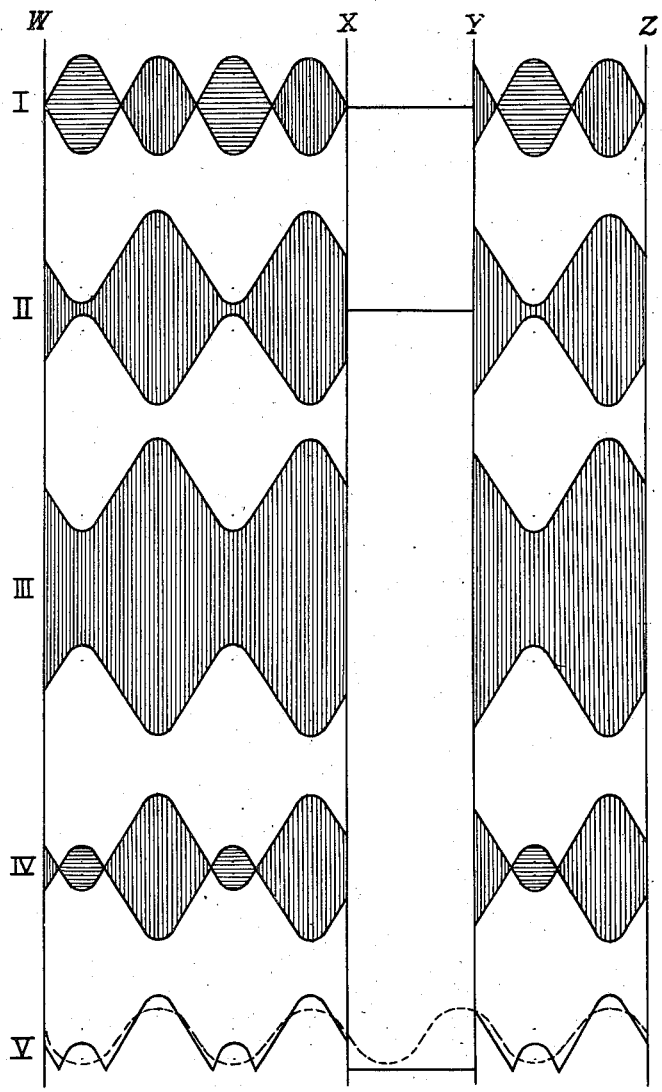
Fig. 2 is a series of related curves useful in explaining the principles of my invention.

The advantage of using such a tuned filter having a comparatively sharp cut-off can be best explained by reference to the curves of Fig. 2. Curve I represents the output from goniometer 2. As is well-known such output will be modulated to such an extent as to involve phase reversal (schematically represented by alternate vertical and horizontal hatching). The time interval XY is assumed to correspond to a keying interval during which the incoming signal vanishes. For the present it will be most convenient to consider only that portion of the curves of Fig. 2 falling within the time interval WX.

By virtue of the addition of energy from the non-directional antenna 1c a curve which is shown in II should ideally be produced. A wave such as shown in curve II, corresponds to the well-known cardioid which is generally assumed to exist when the output of a non-directional antenna is combined with that from the goniometer or other means having a rotating reception pattern. As a matter of practical fact, however, it is difficult to adjust the relative strengths of the signal from the non-directional and the signal from the rotary means so as to give for all wave lengths a combined wave resembling that shown in curve II.

It may be that the ideal adjustment represented in curve II is attained for two or three wave lengths within the range but it will generally occur that at some wave lengths an excess of non-directional energy will be fed to the receiver giving a total input like that of curve III. Likewise, at certain other wave lengths it will generally occur that the energy from the non-directional antenna 1c will be smaller than the energy from the effectively rotating pick-up means and will thus give a resultant wave such as shown in curve IV. In order to avoid the occurrence of a wave such as shown in curve IV, it would be necessary to provide elaborate adjustments for the antennae 1a, 1b and 1c or else to normally adjust the system so that at most wave lengths the energy received from antenna 1c was very greatly in excess of that required. Such excessive non-directional energy, however, is undesirable since the percentage of modulation produced by the effectively rotating pick-up system is thereby reduced thus reducing the accuracy of the directional indication.

In accordance with the present invention the "tuned" type filter 6 is provided so as to enable waves such as those shown in curve IV to be employed even with inertialess indicating devices such as cathode ray oscillographs. The action of filter 6 is best shown in the two curves V of Fig. 2. The solid line curve V indicates the wave form resulting from detection of curve IV with simple smoothing to remove the radio frequencies. It will be clear that the form of this solid line curve is far from sinusoidal and is therefore wholly unsuitable for passing through a phase splitter such as phase splitter 61 of Fig. 6. Likewise, such wave form is also unsuitable for many other sorts of combining and indicating circuits.

If the output of the detector 5 is passed through a sharp "tuned" type filter 6, however, the wave form shown in the solid line curve V is changed to the form shown in the dotted curve V. For the purpose of removing the irregularities of the wave form shown in the portion WX of curves V, it is satisfactory to employ a filter capable of strongly discriminating against the second harmonic of the desired frequency. For some purposes, however, it is preferable to make the filter have a still sharper characteristic.

In the case of keyed waves or waves which are interrupted for short periods by any other means, it is highly desirable to arrange that the indications shall be constant in spite of the temporary cutting off of the wave being measured. Thus, referring to Fig. 2 it is desirable that the dotted sinusoidal curve V should continue through interval XY even though the solid line curve is shut off during this interval. In order to so continue the output of filter 6 it is merely necessary to proportion this filter so as to cut off the side bands which would correspond to a modulation of the desired sine wave at the frequency corresponding to the time interval XY. If, for example, the time interval XY is ⅕ of a second whereas the desired frequency of the output of filter 6 is 20 cycles per second, it is merely necessary to proportion filter 6 so as to strongly discriminate against the frequencies of 20±5 (i. e., against the frequencies 15 and 25) while still passing the desired frequency (20 cycles per second).

If the filter is so proportioned, it will perform two separate functions: Not only will it remove the harmonics of the desired wave and thus prevent distortion as a result of the phenomena shown in curves IV and V but also it will prevent interruption of the filter output as a result of a brief interruption of the incoming signal such as represented by the interval XY.

A third beneficial result obtainable by the use of a "tuned" type filter 6 is that in the case of speech modulated waves or waves which are modulated by natural or man-made interference, the directional indications given will be substantially as clear as if the modulations were not present. Thus, for example, if the rotation rate of the rotary pick-up means is 20 per second and the filter 6 is arranged to discriminate strongly against the second harmonic and all higher harmonics thereof, it is at once clear that voice frequency modulations, whose lower limit is ordinarily not lower than 40 per second, will be completely removed.

If the goniometer 2 is of the mechanically rotating type shown in Fig. 1, such goniometer will ordinarily be rotated at some rate of the order of 10 to 50 rotations per second. In such case the frequency to be handled by filter 6 will be 10 to 50 cycles per second if a non-directional antenna such as $1c$ is used, or will be 20 to 100 cycles per second if such non-directional antenna is omitted and a bilateral indication is to be given. In either case, however, it is clear that the frequencies in question are so low as to make it expensive to provide filter elements of reasonably high Q and therefore in accordance with a particular feature of the present invention it is proposed to employ electromechanical filter means for use in connection with direction finders employing actual rotation of some mechanical member for producing the required effective rotation of the reception pattern. It should be noted, however, that in cases where the effective rotation of the reception pattern is produced electronically ordinary conventional electrical filters may conveniently be employed.

Figure 5:
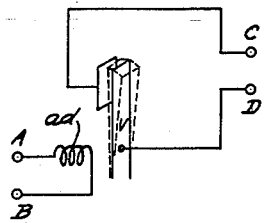
Figs. 3, 4 and 5 illustrate different forms of filters which may be used in the embodiment shown in Fig. 1 in accordance with a special feature of my invention.
Figure 3:
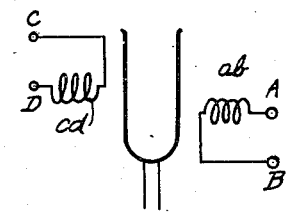
Figure 4:
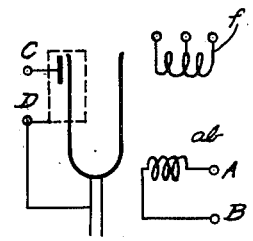

Figs. 3, 4 and 5 illustrate preferred forms of electromechanical filters to be used with radio direction finders having mechanical rotation. In Fig. 3 there is shown a tuning fork used for coupling together two coils $cd$ and $ab$. Preferably, the fork is permanently magnetized and is driven by field from input coil $ab$, the opposite tine of the form then serving to deliver energy to output coil $cd$ of the filter arrangement.

Fig. 4 shows an improved form wherein electrostatic output coupling is employed to avoid possible direct action between the input and output independent of the fork. In this figure a capacitor plate adjacent to the output tine of the fork varies the capacity output terminals CD. By applying a suitable polarization across such capacity an output voltage may be obtained in the manner of a condenser microphone. Since the input is electromagnetic whereas the output is electrostatic direct coupling independent of the fork is minimized. $f$ is a test winding which may be incorporated in a Hartley oscillator circuit to drive the fork for test purposes.

Fig. 5 shows an arrangement similar to Fig. 4 but using a vibrating reed in place of a tuning fork. The damping factor of such reed can readily be adjusted thus varying the effective Q of the filter.

Figure 7:
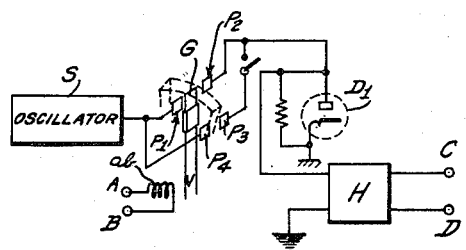
Fig. 7 illustrates an alternative form of filter which may be used in accordance with a further feature of my invention.

Fig. 7 illustrates a filter arrangement adapted to give pulselike peaks in place of sinusoidal waves for the filter output. Such filter may be used with combining circuits and indicators of the form shown in Fig. 6 provided that local generator 7 is arranged to give a sinusoidal output. In such case the connections from generator 7 and filter 6 are merely interchanged so that the sine wave output of generator 7 is applied to phase splitter 61 of Fig. 6, whereas the peaked output of filter 6 is applied to tube 62.

Referring more particularly to Fig. 7, an input coil $ab$ excites a vibrating reed V on the end of which is insulatedly mounted a conducting plate G. A pair of capacitative plates P1 and P2 are mounted on either side of the rest position of conducting plate G. A high frequency from a suitable source S is applied to P1 whereas a detector D1 is connected to P2. When G occupies its rest position there is a substantial coupling between P2 and P1 by way of element G and therefore the output of such detector D1 after amplification if necessary in the amplifier H may then be delivered to output circuit CD for application to the combining circuit.

In operation the reed V is set in vibration by waves of the desired frequency across input terminals AB. As the reed passes through its rest position, a momentary surge of high frequency from oscillator S is coupled through member G from plate P1 to P2 and after rectification in detector D1 and amplification in H produces a brief pulse at output terminals CD. Such brief pulse occurs twice per complete cycle of reed V at the moments of passage of this red through its central position. A bilateral indication will therefore be given even though the input to AB be derived from a system employing a sensing antenna such as $1c$ of Fig. 1.

In order to avoid sensing ambiguities additional plates P3 and P4 may be provided, plate P4 being connected in parallel with plate P1 while plate P3 may be placed in parallel with plate P2 by means of a switch. When plate P3 is connected, an extra pulse in addition to the two brief pulses per cycle which have been above described will be given during the time when the reed is at the right-hand extremity of its swing. Such extra pulse will be easily distinguishable from the two pulses previously mentioned by virtue of its greater duration. This extra pulse being disposed at 90° with respect to the two short pulses above mentioned will serve to indicate which one of these short pulses represents the true direction of the incoming waves.

Figure 8:
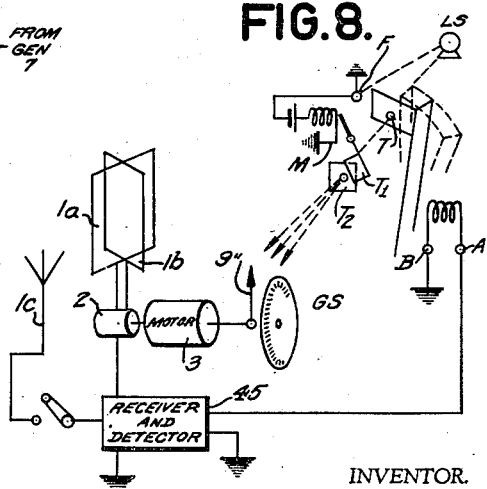
Fig. 8 illustrates a modified system embodying my invention.

Fig. 8 shows a modified system wherein the passage of a light beam through aligned openings is made use of to replace the electrostatic coupling of Fig. 7, whereas the simple rotating pointer 9" illuminated by such light beam replaces the cathode ray tube 9' of Fig. 6, as well as generator 7. Referring more particularly to Fig. 8 pick-up means $1a$, $1b$, $1c$, 2 and motor 3 are substantially as in Fig. 1 whereas receiver and detector 4 and 5 have been combined under a single apparatus 45.

For filter 6 there is provided reed V excited by a coil connected across AB substantially as in Fig. 7 but instead of bearing a conductive coupling member such as G this reed V bears a shutter T pierced by a small opening. A light source LS projects a light through the small opening of T and through an aligned opening in another shutter T2 to illuminate the rotating pointer 9'' which is rotated by motor 3. Since the light beam can only pass through the openings T and T2 when V is in its central or rest position the pointer will be illuminated only for two brief instants during each cycle of the vibration of the reed V.

Due to the persistence of vision therefore a pointer will be seen as standing stationary in two positions 180° apart. A suitable graduated scale GS placed in proximity to the pointer 9'' serves to facilitate direct reading of the direction to be indicated. In order to avoid sense ambiguities an auxiliary shutter T1 may be pivotally mounted so as to cut off the beam's light except when deflected by a sensitive meter movement M. A photocell F is then arranged to actuate the meter movement M in response to illumination and this photocell so positioned as to become illuminated momentarily each time that the shutter T is withdrawn to its right-hand position by the vibration of reed V.

If the meter movement M and associated shutter T1 are arranged to have a suitable operating time it will then result that when the reed V reaches its extreme right-hand position the meter movement will commence to be energized and the resulting withdrawal of shutter T1 will be completed at about the time when the openings in shutters T1 and T2 become aligned during the succeeding half cycle. Thus when reed V passes through its central position while moving from right to left the beam of light will be momentarily permitted to fall upon pointer 9''. Thereafter during the time when the reed V travels from its central position to its left-hand position and back the shutter T1 will return to normal and block the passage of the light so that no illumination will be provided at the instant when the reed V passes through its central position from left to right.

What I claim is:

1. A radio direction finder comprising pick-up means effectively rotating at a predetermined frequency for picking up signals modulated in accordance with such rotation, means for detecting said signals, means for non-directionally picking up signals and for adding them to said signals modulated in accordance with said rotation whereby the resultant signals after detection contain a component of said predetermined frequency, indicator means for giving a directional indication under the control of such detected signals, means for applying said detected signals to said indicator means, and a tuned filter proportioned to pass said predetermined frequency while discriminating strongly against frequencies ten per cent above and below said predetermined frequency before application to said indicator means.

2. A direction finder according to claim 1 further comprising means for non-directionally picking up signals and for adding them to said signals modulated in accordance with said rotation whereby the resultant signals after detection contain a component of said predetermined frequency, and wherein said filter is proportioned to pass said predetermined frequency while discriminating strongly against frequencies ten per cent. above and below said predetermined frequency.

3. A radio direction finder comprising pick-up means effectively rotating at a predetermined frequency for picking up signals modulated at said frequency by virtue of such rotation, further means for non-directionally picking up signals and adding them to said signals modulated at said frequency to yield resultant signals whose envelope curve contains a component of said predetermined frequency, means for detecting said resultant signals, an indicator controllable by sinusoidal waves, a mechanically vibratory member having a natural frequency substantially equal to said predetermined frequency, means for setting said member into vibration under control of said detected signals, and means for delivering sinusoidal waves to said indicator in response to vibrations of said member.

4. A radio direction finder comprising pick-up means effectively rotating at a predetermined frequency for picking up signals modulated at said frequency by virtue of such rotation, further means for non-directionally picking up signals and adding them to said signals modulated at said frequency to yield resultant signals whose envelope curve contains a component of said predetermined frequency, means for detecting said resultant signals, an indicator controllable by sharp electrical pulses, a mechanically vibratory member having a natural frequency substantially equal to said predetermined frequency, means for setting said member into vibration under control of said detected signals, and means for delivering sharp electrical pulses to said indicator in response to vibration of said member.

5. A radio direction finder comprising pick-up means effectively rotating at a predetermined frequency for picking up signals modulated at said frequency by virtue of such rotation, further means for non-directionally picking up signals and adding them to said signals modulated at said frequency to yield resultant signals whose envelope curve contains a component of said predetermined frequency, means for detecting said resultant signals, an indicator controllable by brief flashes of light, a mechanically vibratory member having a natural frequency substantially equal to said predetermined frequency, means for setting said member into vibration under control of said detected signals, and means for mechanically controlling the passage of brief flashes of light to said indicator in response to vibration of said member.

6. A direction finder according to claim 4 wherein said means for delivering sharp electrical pulses comprises means for deriving oscillations of a frequency high in comparison with said predetermined frequency, means for coupling said oscillations to an output circuit in a sharply varying manner under control of the vibrations of said member, and means for delivering to said indicator such coupled oscillations.

7. A direction finder according to claim 5 wherein said means for delivering sharp electrical pulses comprises means for deriving oscillations of a frequency high in comparison with said predetermined frequency, means for coupling said oscillations to an output circuit in a sharply varying manner under control of the vibrations of said member, means for detecting the oscillations coupled to said output circuit and means for delivering to said indicator such detected oscillations.

8. A radio direction finder comprising pick-up means effectively rotating at a predetermined frequency for picking up signals modulated in accordance with such rotation, means for detecting said signals, indicator means for giving a directional indication under the control of such detected signals, means for applying said detected signals to said indicator means, and a tuned filter proportioned with respect to said predetermined frequency for filtering said detected signals before application to said indicator means, comprising a mechanically oscillatory member having a natural period of vibration, input means for setting said member into vibration under control of said detected signals, and output means for influencing said indicator means under control of the vibrations of said member.

9. A radio direction finder comprising pick-up means effectively rotating at a predetermined frequency for picking up signals modulated in accordance with such rotation, means for detecting said signals, indicator means for giving a directional indication under the control of such detected signals, means for applying said detected signals to said indicator means, and a tuned filter proportioned with respect to said predetermined frequency for filtering said detected signals before application to said indicator means, comprising a mechanically oscillatory member having a natural period of vibration, input means for setting said member into vibration under control of said detected signals, and output means for delivering brief electrical signals to said indicator means under control of the vibrations of said member.

10. A radio direction finder comprising pick-up means effectively rotating at a predetermined frequency for picking up signals modulated in accordance with such rotation, means for detecting said signals, indicator means for giving a directional indication under the control of such detected signals, means for applying said detected signals to said indicator means, and a tuned filter proportioned with respect to said predetermined frequency for filtering said detected signals, before application to said indicator means, comprising a mechanically oscillatory member having a natural period of vibrations, input means for setting said member into vibration under control of said detected signals, and output means for delivering brief flashes of illumination to said indicator means under control of the vibrations of said member.

11. A radio direction finder comprising pick-up means effectively rotating at a predetermined frequency for picking up signals modulatively rotating at a predetermined frequency for picking up signals modulated in accordance with such rotation, means for detecting said signals, indicator means for giving a directional indication under the control of such detected signals, means for applying said detected signals to said indicator means, and a tuned filter proportioned to pass said predetermined frequency while discriminating strongly against frequencies ten percent above and below said predetermined frequency.

HENRI G. BUSIGNIES.